June 30, 1970  A. GOLDSTEIN ET AL  3,517,623
RACK SYSTEM
Filed Oct. 28, 1968  2 Sheets-Sheet 1
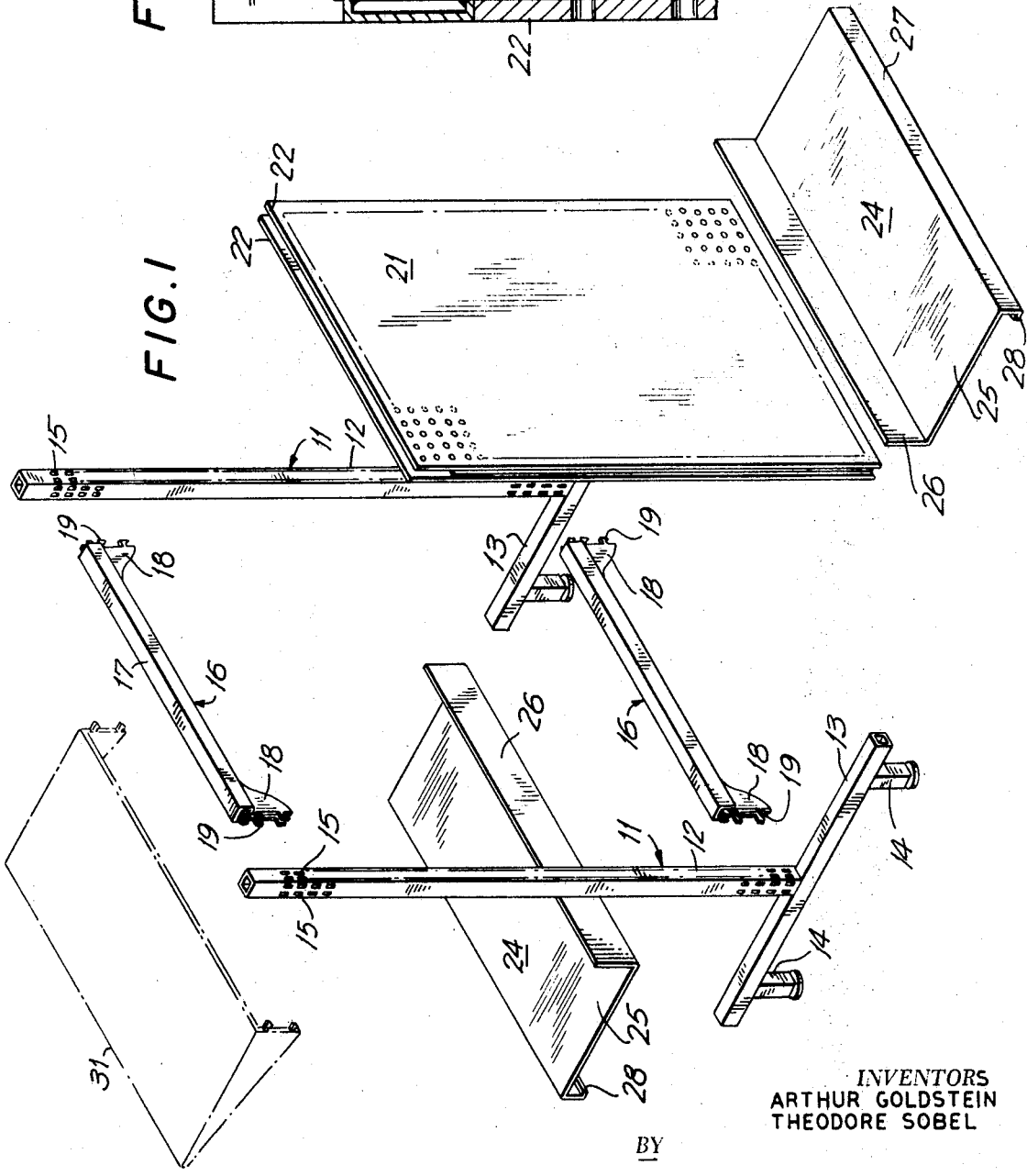
INVENTORS
ARTHUR GOLDSTEIN
THEODORE SOBEL
BY
ATTORNEYS June 30, 1970   A. GOLDSTEIN ET AL   3,517,623
RACK SYSTEM
Filed Oct. 28, 1968   2 Sheets-Sheet 2
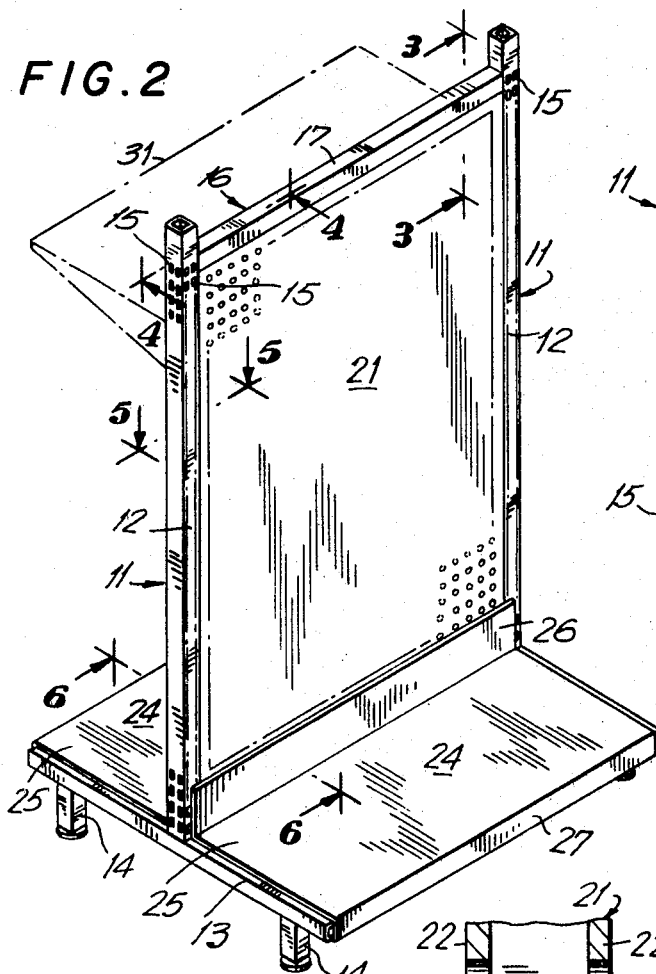
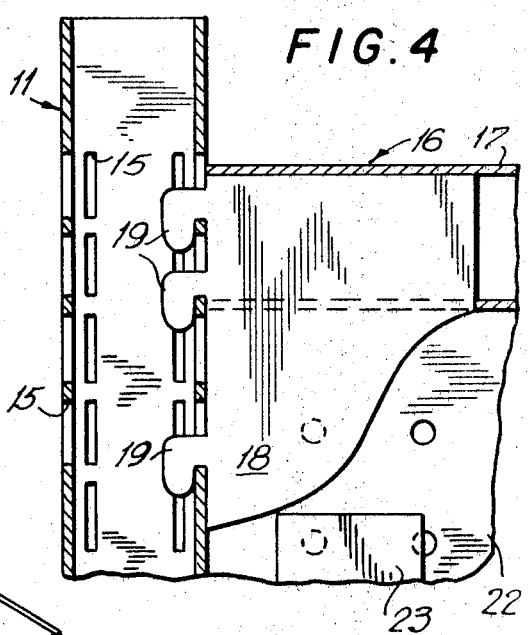
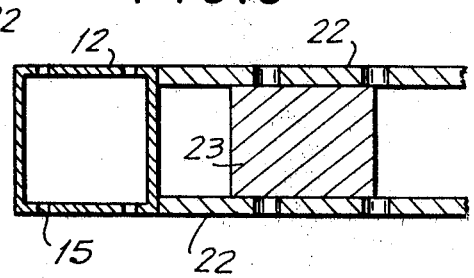
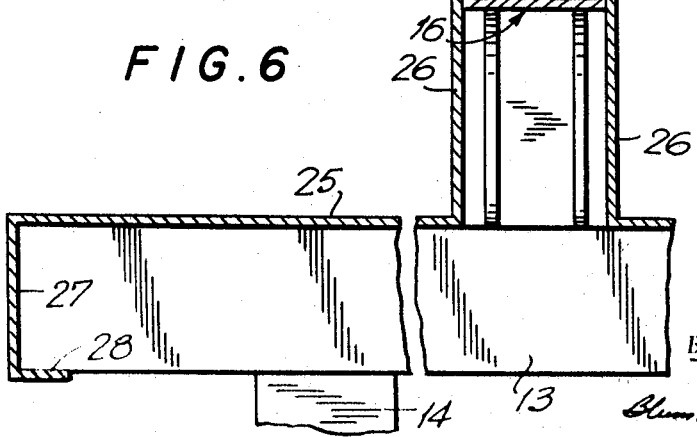
INVENTORS
ARTHUR GOLDSTEIN
THEODORE SOBEL
BY
ATTORNEYS

United States Patent Office 3,517,623
Patented June 30, 1970

---

3,517,623
RACK SYSTEM
Arthur Goldstein, Scarsdale, N.Y., and Theodore Sobel, South Orange, N.J., assignors to Butler Industries, Inc., Newark, N.J., a corporation of New Jersey
Filed Oct. 28, 1968, Ser. No. 771,215
Int. Cl. A47b 3/06
U.S. Cl. 108—114         9 Claims

ABSTRACT OF THE DISCLOSURE

A rack system having component elements which can be assembled to form a continuous rack of any selected length. The basic components consist of uprights, spacers, panels and shelves for retaining the panels in position.

BACKGROUND OF THE INVENTION

This invention relates generally to a rack system of the type especially useful for storing and displaying merchandise for point-of-purchase sale. Rack systems are known in the art and find extensive use in chain and variety stores where the customer serves himself. In order to constantly update merchandise being offered for sale and to change merchandise for changing seasons, the stores find it desirable to constantly change display arrangements, including the size and location of display fixtures. When changing the display arrangements and fixtures, it is desirable that the apparent be versatile to allow for a wide variety of arrangements and be capable of easy assembly and disassembly with minimal tools using unskilled personnel.

It has been found that the prior art systems limit the versatility of the display arrangement, often require tools for the assembly and disassembly of display apparatus, and require the use of reasonably skilled personnel for the assembly and disassembly of the display apparatus.

SUMMARY OF THE INVENTION

Generally speaking, in accordance with the invention, a rack system is provided which is substantially unlimited in the variety and size of displays that can be created and the rack system of the instant invention can be assembled and disassembled without the use of tools and by unskilled personnel. The rack system utilizes basic components for assembly of a display rack of substantially any size, such components consisting of uprights, spacers, panels and shelves with the number of the various components utilized in any display determining the size of the display.

Accordingly, it is an object of this invention to provide an improved rack system which can be assembled from basic components to fabricate a rack of substantially any desired size.

Another object of the invention is to provide an improved track system which substantially eliminates need for small components and fasteners which can be easily lost.

A further object of the invention is to provide an improved rack system which can be assembled with minimal skill without the use of tools.

Still another object of the invention is to provide an improved rack system which can be quickly assembled and disassembled by personnel having minimal skill.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 1 is an exploded perspective view of a rack system constructed in accordance with a preferred embodiment of the instant invention;

FIG. 2 is a perspective view of the rack system of FIG. 1 in assembled condition;

FIG. 3 is a partial sectional view, at an enlarged scale, taken along line 3—3 of FIG. 2;

FIG. 4 is a partial sectional view, at an enlarged scale, taken along line 4—4 of FIG. 2;

FIG. 5 is a partial sectional view, at an enlarged scale, taken along line 5—5 of FIG. 2;

FIG. 6 is a partial sectional view, at an enlarged scale, taken along line 6—6 of FIG. 2.

DESCRIPTION OF THE PREFERRED EMBODIMENT

Referring now to FIGS. 1 and 2, there is shown one unit of the rack system of the instant invention. Such unit is free standing and can be utilized as shown. In order to create a display rack of larger size, additional units can be added, without limit. The unit shown in FIGS. 1 and 2 is a free standing unit of the type known as an island unit. In other words, an island unit allows for display of goods on and access from both sides of the unit. A unit which provides for display of goods and access from only one side may be termed a wall unit since such type of unit will normally be used when placed against a wall or divider. While the unit shown in FIGS. 1 and 2 is an island unit, it will be understood that the rack system of the instant invention can be utilized for wall units as well.

As shown in FIGS. 1 and 2, uprights 11 include a vertical tube 12 secured to a horizontal tube 13 from which extends legs 14. The legs and the vertical tube are suitably connected to the horizontal tube, such as by welding. For a basic unit, two uprights 11 are provided and, for each extension of the system or addition of another unit, one additional upright is provided.

The faces of vertical tube 12 are provided with a plurality of slots 15 or other suitable apertures. The slots on the facing sides of tubes 12 are utilized for connection with spacers extending between the uprights. The spacers are indicated as 16 and each includes a tube 17 and a connecting member 18 which is provided with hooks 19 for engagement in slots 15. With each of the upper and lower spacers 16 connected to uprights 11 by means of connecting members 18, a rigid frame is created which will be free standing as an island unit as shown in FIG. 1 or as a wall unit if suitably modified by placing vertical tube 12 at or near one end of horizontal tube 13.

A detail of the interconnection between spacer 16 and upright 11 is shown in FIG. 4. Connecting member 18 is secured to tube 17 by any suitable means, such as by welding, with hooks 19 extending beyond the end of tube 17. Hooks 19 enter within vertical tube 12 through slots 15 and by downward pressure applied against tube 17, the hooks engage within the slots to form a rigid connection and bring tube 17 into abutment with tube 12. To disconnect the assembly, it is merely necessary to drive tube 17 upwardly and withdraw the hooks from the slots. By this simple arrangement, all four ends of the tube spacers 16 quickly and securely join together uprights 11 without the use of tools and a disassembly is readily accomplished in a reverse manner.

As shown in FIG. 3, the width of tube 17 is the same as the width of tube 12. Two connecting members 18 are provided at each end of the tube 17 with the spacing of the outside surfaces of the connecting members being less than the width of tube 17 for a purpose to be hereafter described.

A back panel 21 is provided as part of the unit. Back panel 21, in an island unit, is formed as a sandwich consisting of two sheets 22 separated by separators 23 as shown in detail in FIG. 5. In the preferred construction, the thickness of the two sheets 22 plus separators 23 equals the width of tube 12 so that a flush assembly is created.

In assembling back panel 21 after spacers 16 have been hooked to uprights 11, the upper edges of the back panel are lifted into place with sheets 22 overlying connecting members 18. The area between the sheets which receives connecting members 18 is free of separators 23. The engagement of sheets 22 with connecting members 18 is seen in FIG. 3 and the purpose for the reduced spacing of the connecting members now becomes apparent. The spacing is determined by the width of tube 17 less the thickness of the two sheets 22. Since a connecting member 18 is provided at each end of the upper spacer 16, the engagement between sheets 22 and the connecting members hold the back panel in place along the upper edge thereof. Along the bottom edge of the back panel, sheets 22 rest along the top surface of tube 17 as shown in FIG. 6.

As a final step in assembling the basic unit of the rack system of the instant invention, means must be provided for retaining back panel 21 in position along the lower edge thereof. To accomplish this, a shelf 24 is provided for each side of the island rack, although the shelf on one side could be set in place prior to assembly of the back panel to the unit. Shelf 24 consists of a base portion 25, an upstanding lip 26, a depending lip 27 and a flange 28. Base portion 25 overlies horizontal tube 13 to provide a surface for receiving and displaying merchandise. Depending lip 27 and flange 28 cooperate to engage over the end of tube 13 in order to releasably secure shelf 24 to the unit. Other suitable means could also be provided for securing shelf 24 to the unit or the shelf could remain in position by gravity, but the utilization of the depending lip and flange provide for frictional retention of the shelf on the unit without the use of additional fasteners whereby the shelf may be mounted and dismounted from the unit without the use of tools.

Upstanding lip 26, as clearly shown in FIG. 6, extends above the upper surface of tube 17 to provide a retaining lip for retention of sheet 12. With an upstanding lip 26 on each side, the lower edge of back panel 21 is thereby firmly held in place.

The simple assembly of the basic unit should now be apparent. With the seven elements shown in exploded view in FIG. 1, the basic unit can be assembled in a matter of moments. To one of uprights 11, an unskilled workman connects the two spacers 16 and the opposite ends of the spacers are then connected to the other upright 11. In making the connections, hooks 19 are merely inserted through slots 15 and the spacers are physically shifted downwardly to create a firm connection. As the next operation, one of shelves 24 is placed position on one side of the unit with depending lip 27 and flange 28 engaging over tube 13 with upstanding lip 26 in abutment with one side of tube 17 and extending thereabove. Next, back panel 21 is moved into place by first engaging sheets 22 at the upper corners over connecting members 18 to thereby hold the upper end in place. The lower edge of the back panel is then moved into position so as to rest on the top surface of lower tube 17 with the location of one of sheets 22 being determined by abutment with the upstanding lip 26 of the shelf already in position. As the final step of assembly of the basic unit, the second shelf is moved into position with depending lip 27 and flange 28 holding the shelf in position and upstanding lip 26 retaining the other side of back panel 21.

With the basic unit, a large variety of merchandise can be displayed. Any number of the usual types of shelves can be suspended from the uprights using slots 15 and a typical shelf is indicated in phantom at 31 in FIGS. 1 and 2. Also, sheets 22 are preferably formed of pegboard to add function to an attractive appearance. Thus, hooks or other elements can be secured to the pegboard in the usual manner for supporting merchandise thereon.

Having described a basic unit, it is now apparent that any number of units can be quickly and easily assembled in a continuous line. For each additional island unit, there would be added two spacers 16, one upright 11, one back panel 21 and two shelves 24. With such a rack system, a store can quickly change its displays, move them about, integrate them for a larger display, separate them for smaller displays, and quickly disassemble them for storage, all without the use of tools and all with such simple components that an expert in the assembly of the rack system is not required.

As mentioned above, an island system has been described as the preferred embodiment although the system is equally suitable as a wall system. In the wall system, one side of the unit would be positioned closely adjacent to a wall or partition and thus goods would be displayed on one side only. Suitable modifications would be made so that the unit could be positioned closely adjacent a wall or partition.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A rack system unit comprising two uprights, each said upright having a vertical member and a horizontal member, two spacer members removably connected to said uprights, said spacer members being spaced vertically from one another and extending transversely of said horizontal members, said vertical members and said spacer members defining a panel receiving area, panel means located in said panel receiving area for defining a back panel, said panel means having upper and lower edges, panel holding means cooperating between said panel means proximate said upper edge and the assembly of said upper spacer member and said vertical members for removably retaining said panel means at said upper edge, said lower edge closely approaching said lower spacer member, and shelf means overlying said horizontal member and having retaining lip means extending above said lower spacer member for removably retaining said panel means at said lower edge.

2. A rack system unit as claimed in claim 1 and including a connecting member at the end of each of said spacer members for removably connecting said spacer members to said uprights, a portion of the connecting members on said upper spacer member extending into said panel receiving area.

3. A rack system unit as claimed in claim 2 wherein said portion of said connecting member extending into said panel receiving area engages with said panel means for retaining said panel means at said upper edge.

4. A rack system unit as claimed in claim 3 wherein said panel means includes two spaced sheets, said spaced sheets receiving therebetween said portion of said connecting members extending into said panel receiving area.

5. A rack system unit as claimed in claim 1 wherein said shelf means includes two shelves, each of said shelves having a base portion in engagement with said horizontal member and an upstanding lip, each said upstanding lip terminating above said lower spacer member and defining a space therebetween for receiving the lower edge of said panel means.

6. A rack system unit as claimed in claim 5 wherein said panel means includes two spaced sheets, the lower edges of said sheets being in engagement with the top surface of said lower spacer member, the portions of said lips extending above said lower spacer member being in engagement with the outside surfaces of said spaced sheets.

7. A rack system unit as claimed in claim 1 wherein said vertical members comprise substantially rectangular tubing having a width dimension, said spacer members including substantially rectangular tubing having a width of the same order as the width dimension of said vertical members, and said panel means including two spaced panels, the outside surfaces of which are spaced apart at said width dimension.

8. A rack system unit as claimed in claim 7 and including a connecting member at the end of each of said spacer members for engagement with said vertical members, a portion of said connecting members on said upper spacer member extending into said panel receiving area, said sheets having a thickness, the overall width of each connecting member being substantially equal to said width dimension taken across the outside surfaces of said panels less the total thickness of said two panels, said portion of said connecting members extending between said two panels for retaining said two panels proximate said upper spacer member.

9. A rack system unit as claimed in claim 7 wherein said shelf means comprises two shelf units, each having a base portion overlying said horizontal member and an upstanding lip, said upstanding lip terminating above said lower spacer member, said upstanding lip engaging a portion of the outside surface of said vertical members, said lower spacer member and the lowermost portion of the outside surface of one of said sheets.

References Cited

UNITED STATES PATENTS

| 2,414,334 | 1/1947 | Schild | 108—101 |
| 2,739,777 | 3/1956 | Schoenhardt | 248—243 |
| 3,028,976 | 4/1962 | Konstant | 108—114 |
| 3,044,632 | 7/1962 | Schild | 108—92 |
| 3,044,634 | 7/1962 | Oztekin | 108—92 |
| 3,185,115 | 5/1965 | Rand | 108—108 |
| 3,186,363 | 6/1965 | Moore | 108—114 |

JAMES T. McCALL, Primary Examiner

G. O. FINCH, Assistant Examiner

U.S. Cl. X.R.

108—60, 92, 101; 248—243